United States Patent
Meyer (10) Patent No.: US 6,701,798 B2
(45) Date of Patent: Mar. 9, 2004

(54) SHIFT DEVICE FOR A MOTOR VEHICLE GEARBOX

(75) Inventor: Jörg Meyer, Wagenfeld (DE)

(73) Assignee: ZF Lemförder Metallwaren AG, Dielingen (DE)

( * ) Notice: Subject to any disclaimer, the term of this patent is extended or adjusted under 35 U.S.C. 154(b) by 0 days.

(21) Appl. No.: 10/048,733

(22) PCT Filed: May 30, 2001

(86) PCT No.: PCT/DE01/02051
§ 371 (c)(1),
(2), (4) Date: Jan. 30, 2002

(87) PCT Pub. No.: WO01/92764
PCT Pub. Date: Dec. 6, 2001

(65) Prior Publication Data
US 2002/0112558 A1 Aug. 22, 2002

(30) Foreign Application Priority Data
May 31, 2000 (DE) .......................... 100 26 796
Jun. 9, 2000 (DE) .......................... 100 28 649

(51) Int. Cl.[7] .................... F16H 59/10; F16H 61/22
(52) U.S. Cl. .................... 74/473.21; 74/473.23
(58) Field of Search ................. 74/473.21, 473.22, 74/473.23, 473.24, 473.26, 473.28, 106; 192/220.2, 220.3, 220.4

(56) References Cited

U.S. PATENT DOCUMENTS

| | | | |
|---|---|---|---|
| 4,926,688 A | | 5/1990 | Murasaki |
| 5,096,033 A | * | 3/1992 | Osborn .................... 477/96 |
| 5,402,870 A | | 4/1995 | Osborn |
| 5,718,312 A | * | 2/1998 | Osborn et al. ........... 192/220.4 |
| 5,938,562 A | * | 8/1999 | Withey .................... 477/96 |

FOREIGN PATENT DOCUMENTS

| | | |
|---|---|---|
| DE | 41 20 379 | 6/1991 |
| DE | 197 28 064 | 7/1997 |
| DE | 198 18 864 | 4/1998 |
| DE | 198 25 479 A1 | 6/1998 |
| DE | 19728064 | 1/1999 |
| JP | 01293233 | 11/1989 |
| JP | 09189353 | 7/1997 |
| JP | 11315912 | 11/1999 |

* cited by examiner

Primary Examiner—William C. Joyce
(74) Attorney, Agent, or Firm—McGlew and Tuttle, P.C.

(57) ABSTRACT

An automatic transmission of a motor vehicle is provided that can be in at least one secured state and one unsecured state has a pivotable selector lever for selecting different gears and/or gear selections and has a first blocking mechanism, which can block the pivoting movement of the selector lever. The first blocking mechanism has a displaceable blocking element and a stationary blocking contour for engaging the blocking element and can prevent the selector lever from being pivoted by the blocking element engaging the blocking contour. A second blocking mechanism has a toggle lever, which is in contact with a stop in a stretched-out blocking position and prevents the release of the first blocking mechanism and makes possible the unlocking of the first blocking mechanism in the release position. A release mechanism releases the toggle lever from the stretched-out blocking position. The toggle lever is arranged such that one leg of the toggle lever acts on the blocking element of the first blocking mechanism.

14 Claims, 7 Drawing Sheets

Fig. 8

SHIFT DEVICE FOR A MOTOR VEHICLE GEARBOX

FIELD OF THE INVENTION

The present invention pertains to a shifting device of a transmission, especially an automatic transmission, of a motor vehicle, which can be in at least one secured state and one unsecured state.

BACKGROUND OF THE INVENTION

Such a secured state of the shifting device, more precisely of the selector lever, is used, e.g., in order to embody a so-called "Key Lock" or "Shift Lock" system on a shifting device, where it is ensured hereby that the selector lever can be moved from a certain position, e.g., from the "P" position, only when either the ignition key of the vehicle is in a certain position and/or the brake of the vehicle is actuated. It is ensured here by a corresponding mechanism or another device that unlocking of the selector lever is possible only when the vehicle is in a certain configuration, e.g., with the brake actuated, whereas unlocking of the selector lever and consequently putting the vehicle into gear is prevented in other configurations of the vehicle.

A similar shifting device has been known, e.g., from the patent specification U.S. Pat. No. 5,402,870. This is a shifting device for an automatic transmission, which can be in a secured state and in an unsecured state, where a pivotable selector lever is present for selecting different gear selections and the selector lever has a first locking mechanism, which can block the pivoting movement of the selector lever, and this first blocking mechanism has a displaceable blocking element (detent pawl), which can engage a stationary blocking contour on a blocking plate (detent plate) and prevents the selector lever from being pivoted in case of the blocking element engaging the blocking contour. Furthermore, the shifting device has a second blocking mechanism with a toggle lever, which is in contact with a stop in a stretched-out blocking position and indirectly prevents the first blocking mechanism from being released by means of a bolt by engaging a push rod which is displaceable axially to the selector lever and to which the blocking element is fastened, while the toggle lever makes possible the unlocking of the first blocking mechanism in the bent position by the bolt, which has blocked the axially movable rod, being retracted.

In the blocking position of the toggle lever, i.e., in a stretched-out position, in which the toggle lever is bent only slightly, the center of the toggle lever is in contact with a stop in the area of the pivotable connection between the two legs of the toggle lever, so that the toggle lever securely maintains its stretched-out position. If the toggle lever is to be transferred from this stretched-out blocking position into a bent release position, an electromagnetically controlled releasing device acts on the center of the toggle lever and pulls the toggle lever into a bent position, in which the blocking of the displaceable rod is abolished.

The drawback of this prior-art device is that a relatively large number of movable parts are needed to embody this. As a result of the manufacturing costs are high, on the one hand, and there is a high probability that frequent repairs will be needed, on the other hand.

SUMMARY OF THE INVENTION

The object of the present invention is to find a shifting device which can be in at least one secured state and an unsecured state, wherein the number of movable parts shall be as low as possible.

The inventor has recognized that a substantial simplification of the shifting device can be achieved by an improved arrangement and more favorable working point of the toggle lever.

Thus, according to the invention an automatic transmission of a motor vehicle, which can be in at least one secured state and one unsecured state has a pivotable selector lever for selecting different gears and/or gear selections and has a first blocking mechanism, which can block the pivoting movement of the selector lever. The first blocking mechanism has a displaceable blocking element and a stationary blocking contour for engaging the blocking element and can prevent the selector lever from being pivoted by the blocking element engaging the blocking contour. A second blocking mechanism has a toggle lever, which is in contact with a stop in a stretched-out blocking position and prevents the release of the first blocking mechanism and makes possible the unlocking of the first blocking mechanism in the release position. A release mechanism releases the toggle lever from the stretched-out blocking position. The toggle lever is arranged such that one leg of the toggle lever acts on the blocking element of the first blocking mechanism.

It is achieved due to this arrangement of the at least one toggle lever according to the present invention that the blocking element is not acted on any more by the manually actuated means, which can bring about the disengagement of the blocking element from the blocking contour, but directly by the toggle lever itself, without a mechanical roundabout way, and it blocks this blocking element as the case may be, so that pivoting of the selector lever is not possible. Due to this change in the working point of the toggle lever, it is possible, e.g., to do away with a bolt at the toggle lever, as it is present in the state of the art and which can block the movement of a rod. Furthermore, it is also possible to block first blocking mechanisms of various designs as a result.

Provisions are made in a special embodiment of the shifting device according to the present invention for the leg of the at least one toggle lever acting on the blocking element to be connected to the blocking element in a rotatingly movable manner, where the blocking element may preferably form an axis of rotation of the leg at the same time. Such an embodiment is embodied, e.g., in the following exemplary embodiment. However, it is also obvious that the blockage of the blocking element can be brought about by a leg extending only under the corresponding blocking element and thereby bringing about a blockage, without having to be rigidly connected to this blocking element. The exemplary embodiment to be described later shows a shifting device, in which the blocking element is arranged at a push rod displaceable axially in relation to the selector lever, where the push rod also extends in the selector lever itself here.

However, an embodiment is also possible, in which the blocking element is arranged at the end of a bowden cable that can be actuated manually, so that the displaceable rod can be replaced with a bowden cable, which can now be arranged in any desired manner.

According to the present invention, the stationary blocking contour may also be, e.g., part of a blocking plate connected to a shifting device housing. However, it is also possible, for instance, to accommodate the blocking contour in other stationary elements of the shifting device, e.g., at the housing, so that the blocking element engages a contour of the shifting device housing.

In another special embodiment of the shifting device, the inventor proposes that the release mechanism for releasing the toggle lever from the stretched-out blocking position have an electromagnetically or hydraulically movable pushing element, preferably a bolt, which can bring about the bending of the toggle lever. If an electromagnetically movable pushing element is embodied, the particular position of the toggle lever can be brought about in the sense of a "Key Lock" or "Shift Lock", e.g., by means of an electric switch, which is connected to the brake pedal, and/or a switch that is connected to the ignition lock.

However, it may also be particularly advantageous for the releasing device to have a hydraulically movable pushing element. As a result, a hydraulic connection can be established between the brake circuit system and the pushing element, so that release of the toggle lever can indeed take place only when a corresponding hydraulic pressure builds up in the brake system of the vehicle. This means that the release of the secured state is made possible only when the brake system indeed functions and not already when the brake pedal is simply actuated. An additional safety aspect is achieved as a result, because the vehicle is secured from starting moving even in case of failure of the hydraulic system of the brake system.

According to another embodiment of the shifting device, the inventor also proposes that the release mechanism for releasing the toggle lever from the stretched-out blocking position have an electromagnet, wherein a permanent magnet, which is located directly opposite the electromagnet in the stretched-out blocking position and wherein the electromagnet generates a magnetic field repelling the permanent magnet to release the toggle lever, is arranged in the center of the toggle lever.

In another embodiment of the shifting device, it is proposed that a securing element, which holds the toggle lever reversibly in the stretched-out position, wherein release of the toggle lever cannot be brought about accidentally even by the vibration of the vehicle, be provided at the toggle lever.

Such a securing element may be, e.g., a spring element, which acts on the legs of the toggle lever and holds the legs of the toggle lever in the stretched-out blocking position by a gentle pressure, as is shown in the exemplary embodiment to be described below.

In another embodiment of the securing element, a permanent magnet may be provided, which is arranged at and acts on the axis between the legs of the toggle lever and holds the toggle lever as a result in the stretched-out blocking position with a weak magnetic force. If this variant of the securing element is embodied in conjunction with the release mechanism by an electromagnet, the permanent magnet may be, e.g., the core of the electromagnet, whose pole is reversed in case of release by a correspondingly stronger electromagnet and leads to a repelling effect at the toggle lever and brings about the release of the toggle lever as a result.

Provisions are made in another preferred embodiment of the shifting device for arranging two toggle levers on both sides of the selector lever, where at least one opposite toggle lever leg pair each and preferably both toggle lever leg pairs may be connected to one another such that a synchronous movement of the toggle levers arranged on both sides is forced to take place.

It is pointed out that the shifting device according to the present invention may be a shifting device that transmits its shift commands to a manual transmission or automatic transmission either mechanically or in a powerless manner, e.g., electrically or optically.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
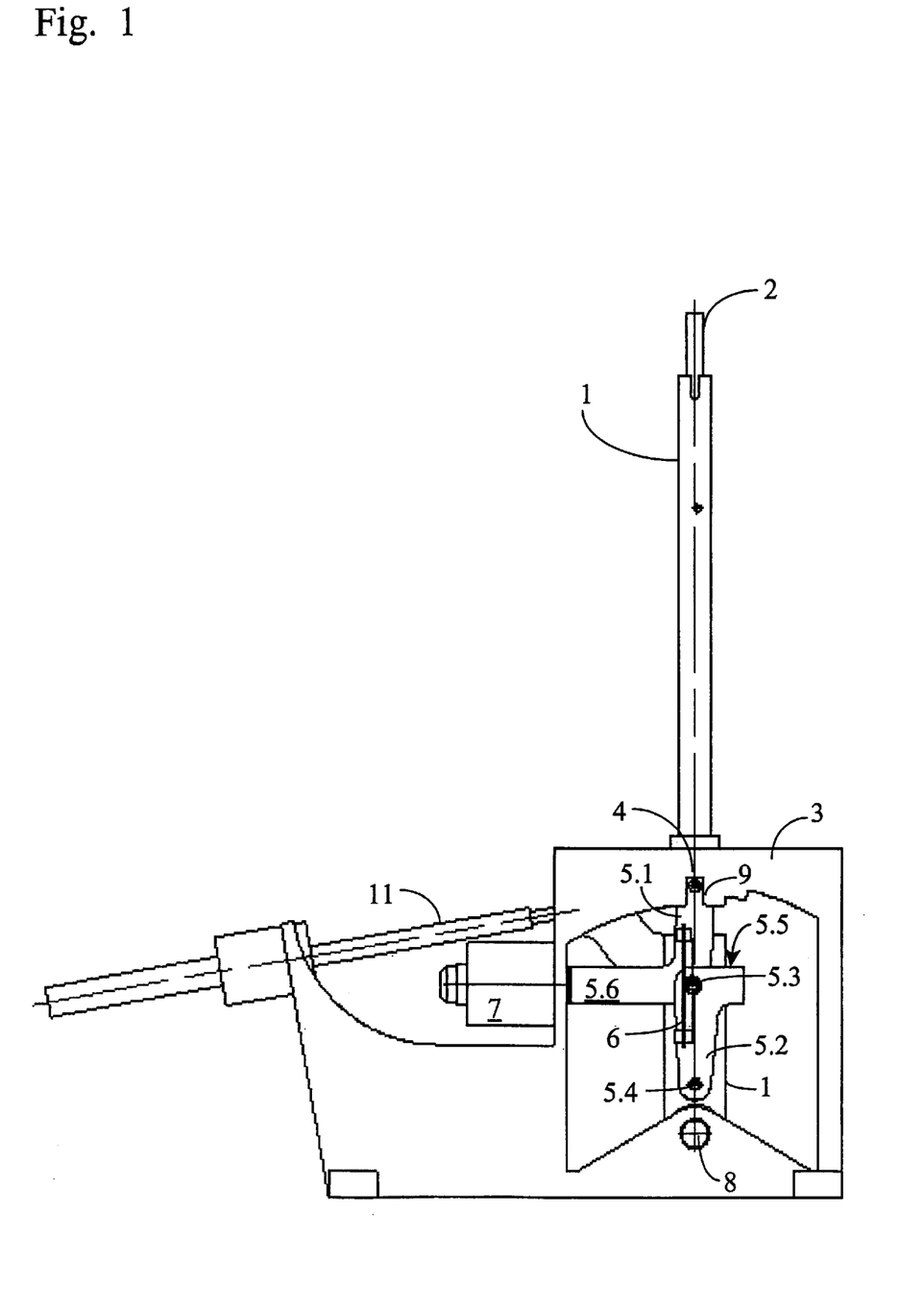
FIG. 1 is a side view of a shifting device for an automatic transmission with the selector lever in the "P" position with the toggle lever in the stretched-out blocking position.

Referring to the drawings in particular, FIG. 1 shows the side view of a shifting device according to the present invention for an automatic transmission. The shifting device has a selector lever 1, in which a push rod 2 is arranged axially displaceably. The selector lever 1 is mounted pivotably around a selector axis 8 and is in a parking position ("P" position) in the situation being shown, which prevents the vehicle from rolling away. The push rod 2 itself is connected to a locking pin 4 and is elastically pushed upward by a coil spring 10, which is not visible here, and the locking pin 4 engages a blocking contour 9, which is arranged at a stationary bridge 3. Due to the upwardly directed spring action of the coil spring 10, the locking pin 4 moves into the blocking contour 9 and prevents the selector lever 1 from being pivoted in the known manner.

Unintended release of the locking pin 4 from the blocking contour 9 and consequently of the selector lever 1 from the position being shown here is prevented from occurring by a toggle lever 5, which permits the locking pin 4 to move away in a certain vehicle configuration only. This is achieved here according to the present invention by the toggle lever acting with an upper leg 5.1 directly on the locking pin 4, which acts as a blocking element here. The second, lower leg of the toggle lever is connected to the lower part of the pivotable selector lever 1 via a lower toggle lever axis. The locking pin 4 is used at the same time as an upper toggle lever axis. Due to the stretched-out position of the toggle lever 5, the locking pin 4 and consequently also the selector lever 1 are prevented from being released. To release the toggle lever into a released, bent position, a release mechanism 7 is provided, which comprises in the example being shown here an electromagnetically driven release bolt 7.1, which moves out for the release and exerts a push at right angles to the stretched-out "longitudinal axis" of the toggle lever and it can thus transfer the toggle lever into a bent, released position. The release bolt 7.1 (shown in FIG. 3) located in the electromagnetic release mechanism 7 exerts a push against a rectangular leg extension 5.6 of the upper leg of the toggle lever 5 and thus brings about a bending. To prevent unintended bending, e.g., due to vibrations of the vehicle, a spring 6, which applies a slight pretension on the toggle lever in the direction of the stretched-out blocking position, is arranged as a safety device at the toggle lever. Furthermore, on the opposite side from the rectangular leg extension 5.6, the toggle lever has a stop 5.5 (shown in FIG. 7), which is arranged such that a stretched-out blocking position of the toggle lever is obtained, which is characterized by only a slight deflection of the toggle lever 5 in the direction of the release mechanism 7, being supported by the stop 5.6, and thus it ensures secure blocking.

Figure 2:
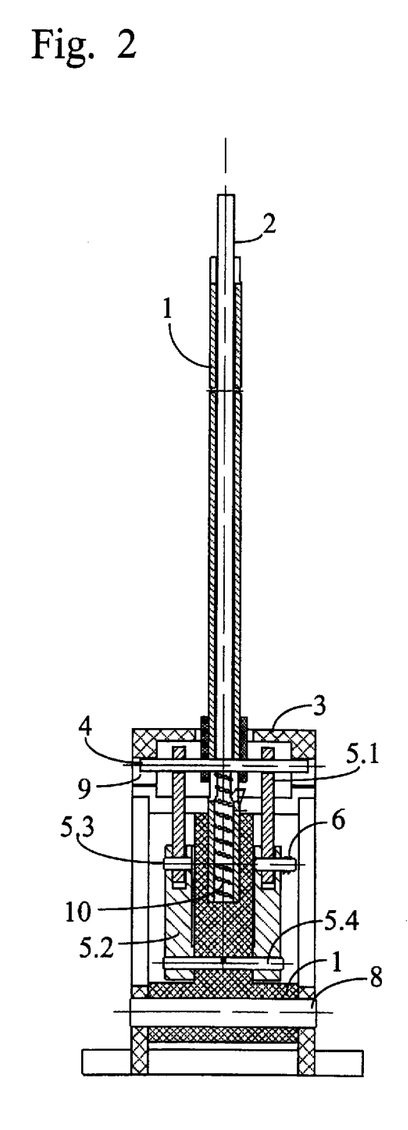
FIG. 2 is a cross sectional view of the shifting device with the selector lever in the secured "P" position with the toggle lever in the stretched-out blocking position.

FIG. 2 shows a cross section through the shifting device according to the present invention from FIG. 1. It can be additionally recognized here that one toggle lever each is arranged on both sides of the selector lever 1 for reasons of better distribution of the forces, and that the locking pin 4 intersects the push rod 2, projects from the selector lever 1 in a slot on both sides and forms the upper toggle lever axis at the same time. The coil spring 10, which pushes upward the locking pin 4 and consequently the push rod 2 fastened thereto, is also clearly recognizable in this cross section. FIG. 2 also shows that the blocking contour 9, which represents in its continuation a locking means for the different positions of the selector lever, is likewise arranged on both sides of the selector lever 1 in a bridge 3.

Figure 3:
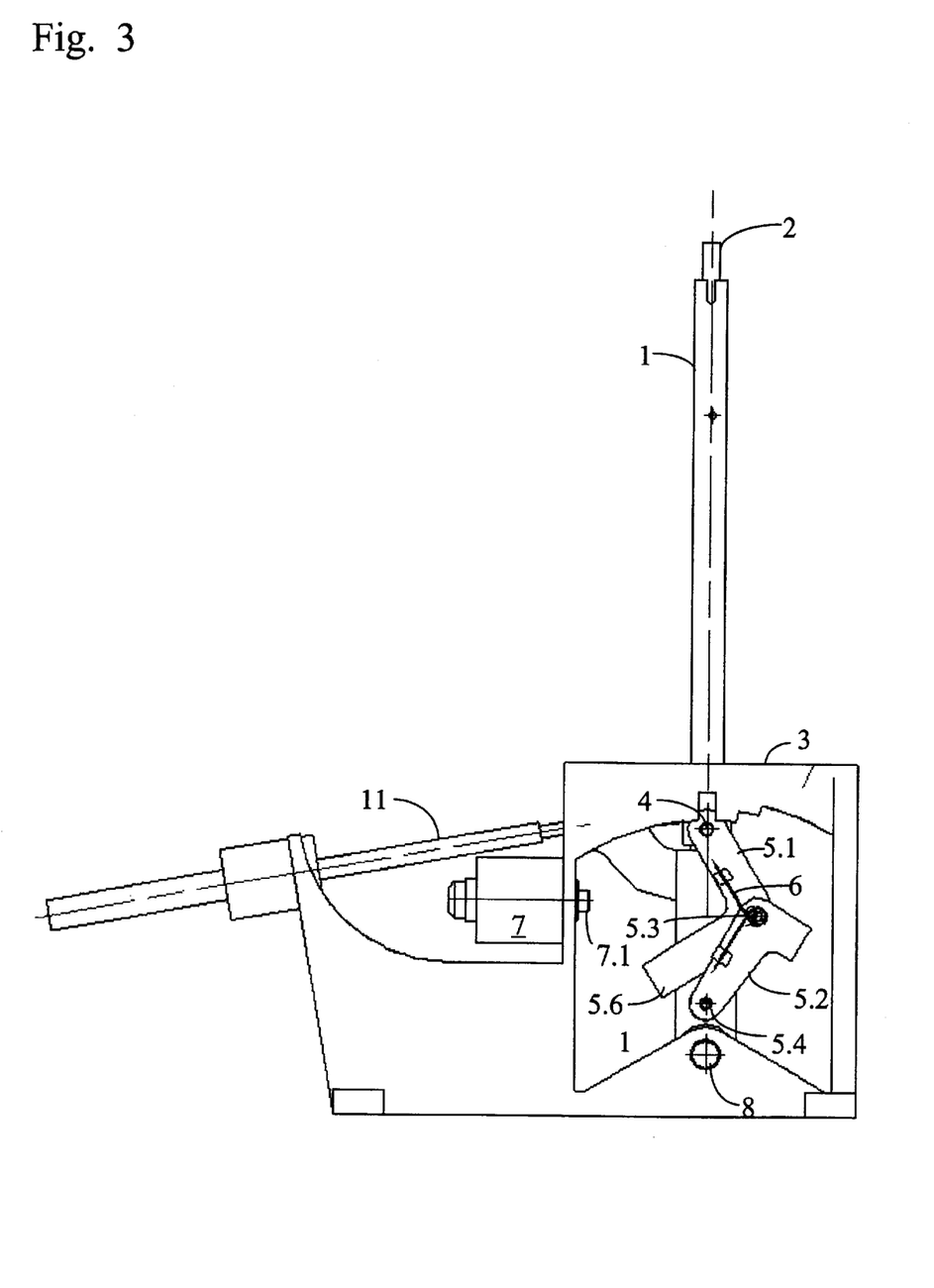
FIG. 3 is a side view of the shifting device with the selector lever in the released "P" position with the toggle lever released.

FIG. 3 shows this shifting device in a side view corresponding to FIG. 1, the selector lever 1 being in the "P" position as before. However, bending of the toggle lever 5 has been brought about by the moving out of the release pin 7.1, so that the push rod 2—not shown here—was able to move downward and the locking pin 4 was able to move out of the blocking contour 9, so that pivoting of the selector lever 1 is now possible.

The release bolt can be moved out, e.g., by the brake in the vehicle having been actuated or by the key of the vehicle having been turned into a certain position or by both conditions being satisfied in combination, so that it is ensured that no unintended pivoting of the selector lever 1 and consequently movement of the vehicle takes place. It is obvious that such a locking of the selector lever according to the present invention can be used not only in the case of an automatic transmission but it can also be used for a shifting device of a manual transmission by blocking, e.g., the first gear after it has been put in and secured as described here.

Figure 4:
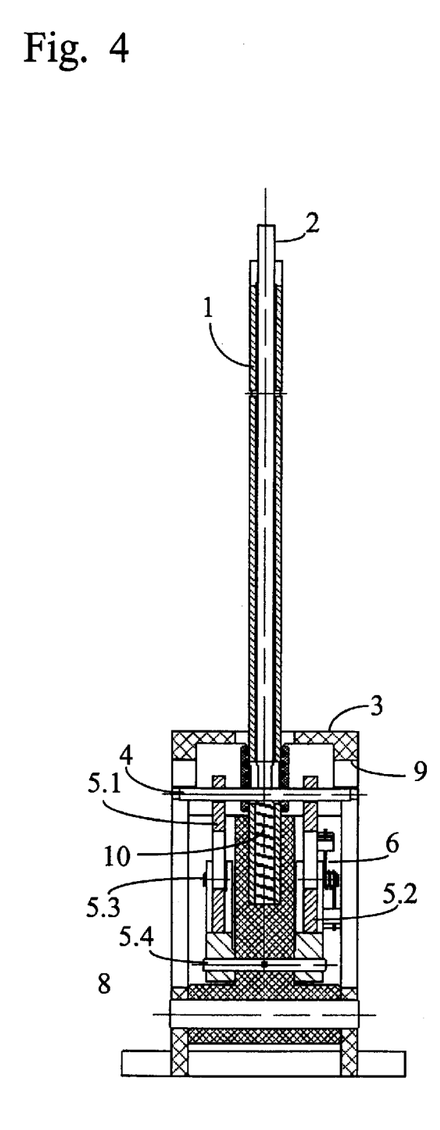
FIG. 4 is a cross sectional view of the shifting device with the selector lever in the released "P" position with the toggle lever released.

FIG. 4 shows a cross section of the shifting device from FIG. 3. It also be recognized here that the toggle levers 5 arranged on both sides, which are otherwise connected rigidly to one another via a rectangular leg extension 5.6 and via a stop 5.5, which is not visible here, were released and the push rod 2 has moved downward, so that the selector lever 1 can now be freely pivoted.

On the whole, a toggle lever 5 with two toggle lever legs 5.1, 5.2 pivotable around a central toggle lever axis 5.3 is arranged such that one toggle lever leg 5.1 acts with its end pivotably on the locking pin 4 and the other toggle lever leg 5.1 is connected, likewise pivotably, to the selector lever 1. The toggle lever has a stop 5.5 here, which acts as a support in the nearly completely stretched-out position, as a result of which the locking pin 4 is prevented from being released. A weak deflecting force is applied on the middle toggle lever axis by a release mechanism 7 for unlocking the toggle lever 5, so that the toggle lever is pushed over its dead center, it can now bend freely and can be subsequently bent further by manually actuating the push rod 2.

Figure 5:
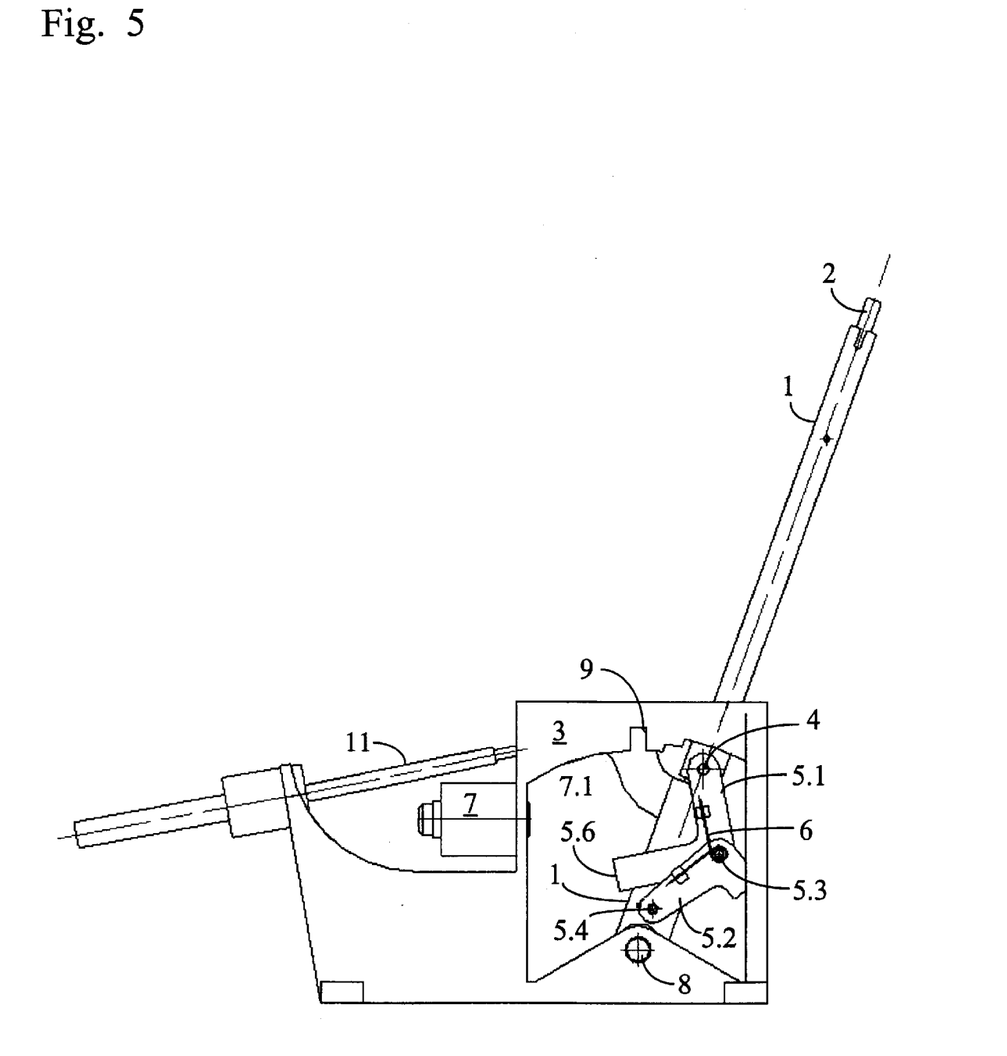
FIG. 5 is a side view of the shifting device with the selector lever in the "D" position with the toggle lever released.

FIG. 5 shows a side view of the shifting device according to the present invention, in which the selector lever 1 is in a drive position (here "D" position). The toggle link, which is pivotably fastened with its upper toggle lever to the locking pin 4, is also pivoted during the pivoting movements of the selector lever, and it can bend freely. The blocking contour 9 with the locking means extending farther to the right is arranged here such that there always is a distance between the higher blocking position and the further course of the blocking contour, as a result of which the toggle lever 5 cannot move out into the stretched-out position in any position other than the "P" position and thus it cannot bring about a locking of the push rod 2.

FIG. 6 shows once again a longitudinal section of the shifting device. The selector lever 1 is likewise in the "P" position as in FIG. 1 and is locked in the blocking contour 9, while the toggle lever 5 is in the stretched-out blocking position. The stop 5.5 of the toggle lever, which is in contact with the lower part of the selector lever 1 in the stretched-out blocking position, can be recognized on the right-hand side of the selector lever 1. At the same time, the rectangular leg extension 5.6 of the toggle lever 5 is located directly at the release mechanism 7 with the release bolt 7.1.

Figure 6:
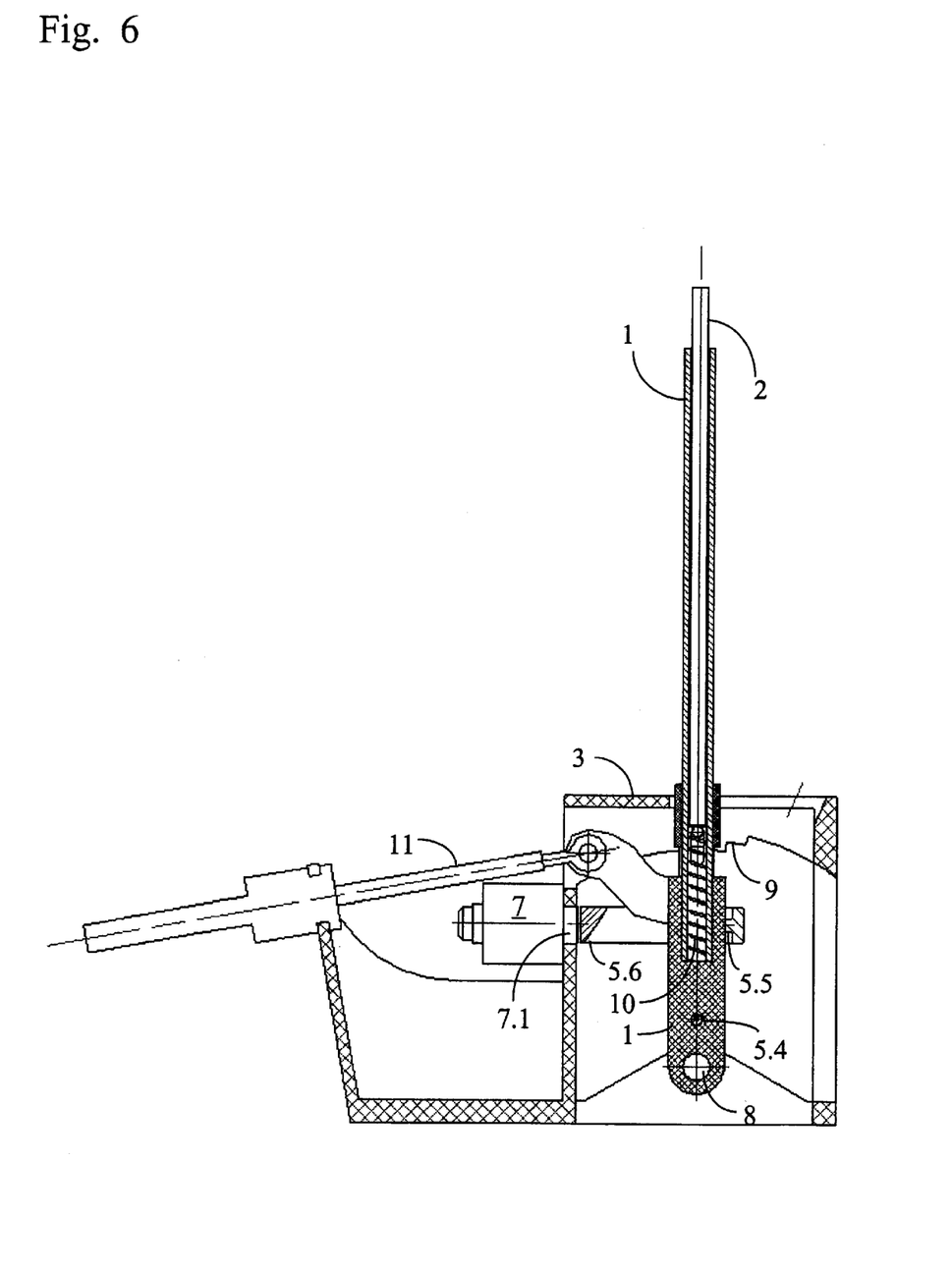
FIG. 6 is a longitudinal sectional view of the shifting device with the selector lever in the secured "P" position with the stretched-out toggle lever at stop.
Figure 8:
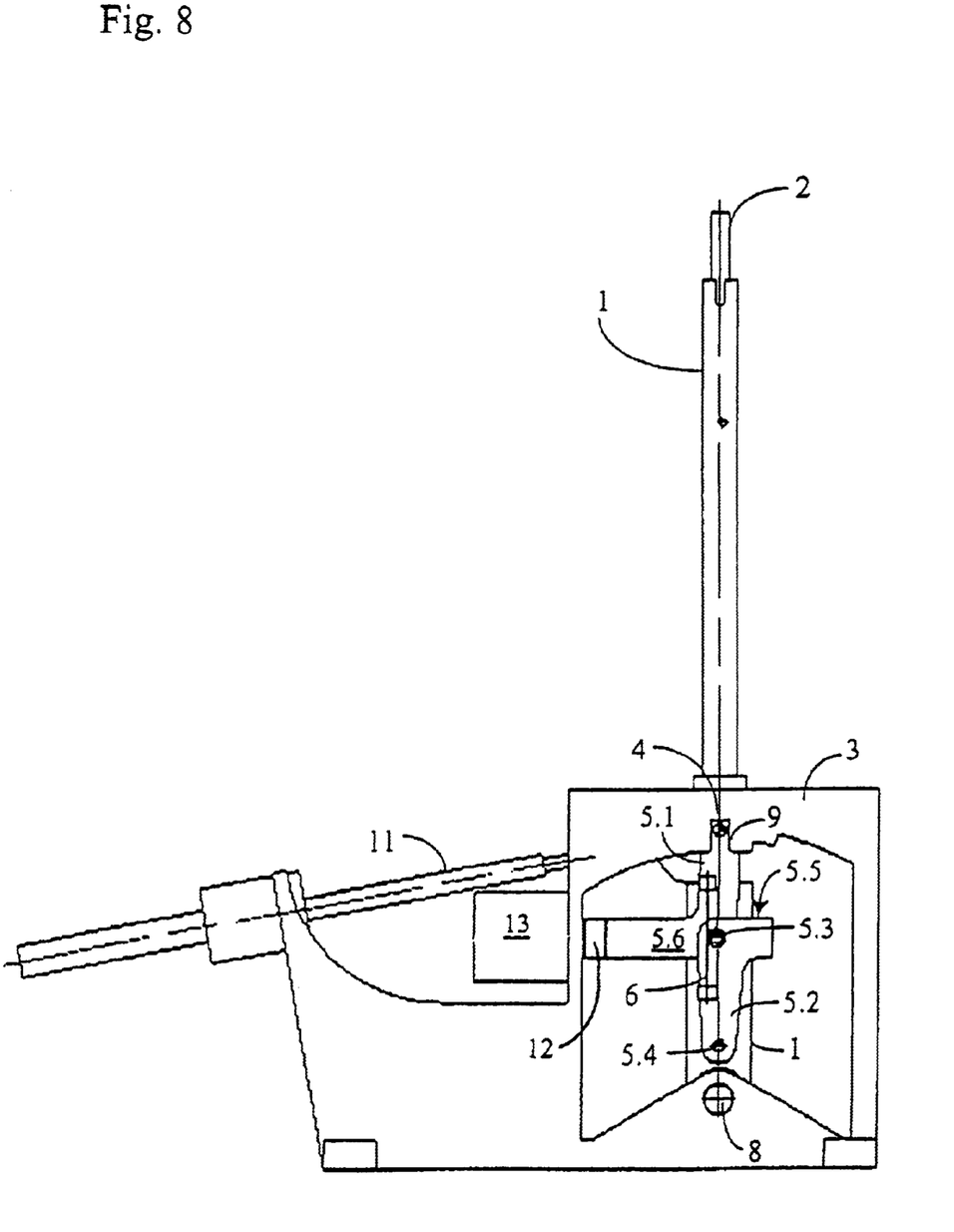
FIG. 8 is a side view of an alternate embodiment of a shifting device for an automatic transmission incorporating a magnet and an electromagnet for releasing and holding the toggle mechanism.

Instead of the securing spring 6, which is indicated only partially in this section, it is also possible to arrange a magnet 12, e.g., at the left-hand end of the rectangular leg extension, this magnet exerting a securing function for the toggle lever in the stretched-out securing position, and it is possible to arrange instead of the release bolt 7.1 only a metal core of an electromagnet 13, which is magnetized for releasing the toggle lever such that a repelling force is generated between the rectangular leg extension 5.6 and the metal core.

Figure 7:
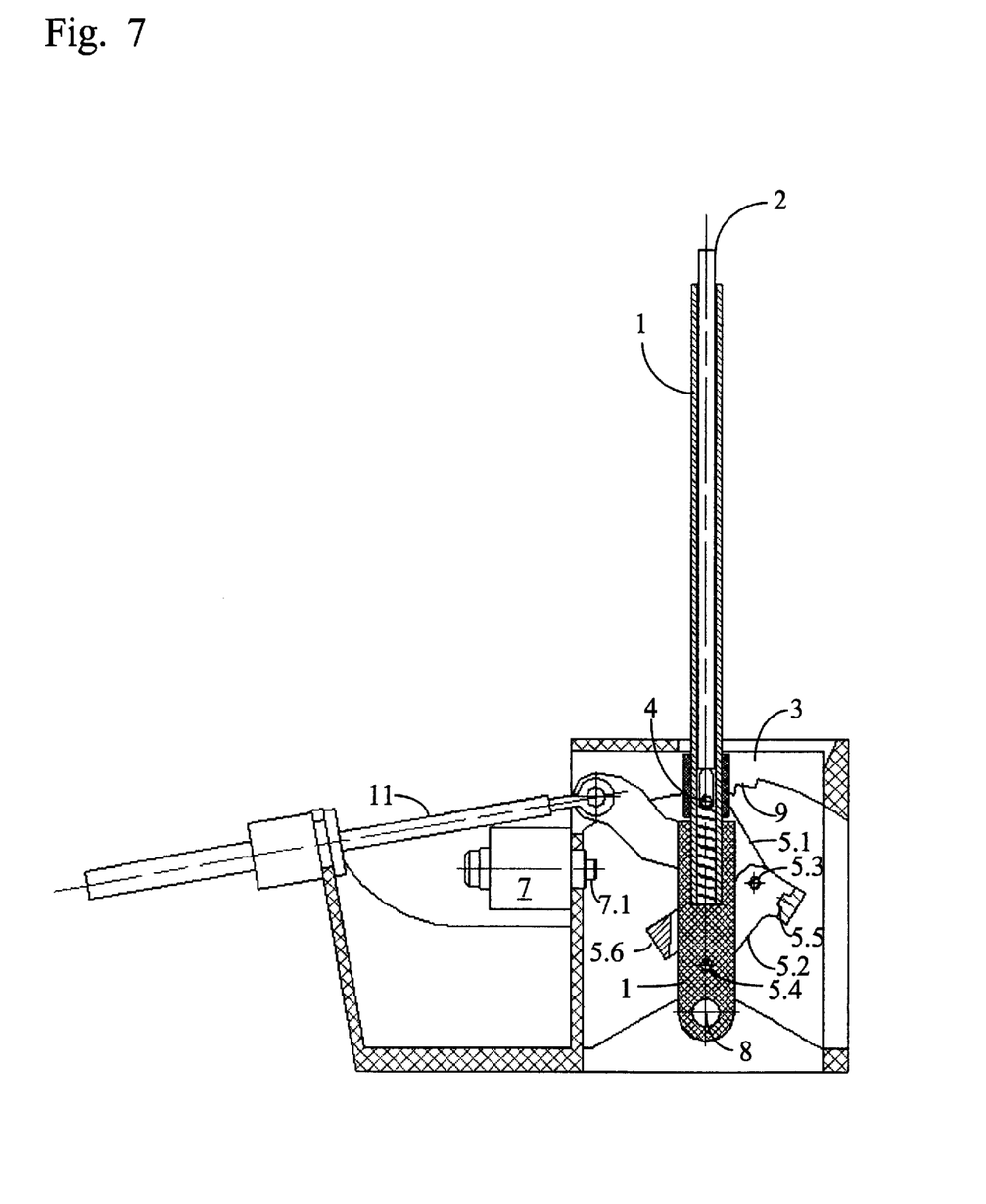
FIG. 7 is a longitudinal sectional view of the shifting device with the selector lever in the released "P" position with the toggle lever released.

Finally, FIG. 7 likewise shows a longitudinal section through the shifting device according to FIG. 3 with the selector lever 1 in position "P" and with a toggle lever 5 in the released position. The release bolt 7.1 of the electromagnetic release mechanism 7 is moved out here and it has pushed aside the toggle lever 5 at the rectangular leg extension 5.6 and brought it into a bent position.

A bowden cable 11, which is connected to the selector lever 1 via a hinge and transmits the selection movements to an automatic transmission, is additionally shown in the above-described figures. It is pointed out that the present invention is not limited exclusively to the mechanical transmission of selection movements, but such an embodiment can also be used in shifting devices that transmit their shift commands to an automatic transmission or another vehicle transmission in a powerless manner, e.g., optically or electronically.

On the whole, the present invention consequently shows a shifting device which can be in a secured or unsecured position, and in which the number of movable parts was reduced compared with the state of the art.

While specific embodiments of the invention have been shown and described in detail to illustrate the application of the principles of the invention, it will be understood that the invention may be embodied otherwise without departing from such principles.

What is claimed is:

1. A motor vehicle automatic transmission shifting device that can be in at least one secured and one unsecured state, the device comprising:

a pivotable selector lever for selecting different gears and/or gear selections;

a first blocking mechanism to block the pivoting movement of the selector lever, the first blocking mechanism having displaceable blocking element and at least one stationary blocking contour for engaging the blocking element, the selector lever being prevented from pivoting by the blocking element engaging the blocking contour;

a second blocking mechanism with at least one toggle lever in contact with a stop for preventing the releasing the first blocking mechanism in a stretched-out blocking position and unlocking the first blocking mechanism in the bent release position and a release mechanism for releasing the toggle lever from the stretched-out blocking position, the toggle lever directly acting on the blocking element of the first blocking mechanism.

2. A shifting device in accordance with claim 1, wherein the leg of the toggle lever acts on the blocking element and is connected to the blocking element in a rotatingly movable manner, wherein the blocking element forms an axis of rotation of the leg.

3. A shifting device in accordance with claim 1, wherein the blocking element is arranged at a push rod, said push rod being displaceable axially in relation to the selector lever and extending in the selector lever.

4. A shifting device in accordance with claim 1, wherein the blocking element is arranged at the end of a bowden cable which can be actuated manually.

5. A shifting device in accordance with claim 1, wherein the stationary blocking contour is part of a blocking plate or bridge connected to a shifting device housing.

6. A shifting device in accordance with claim 1, wherein the release mechanism for releasing the toggle lever from the stretched-out blocking position has an electromagnetically or hydraulically movable bolt pushing element for bending of the toggle lever.

7. A shifting device in accordance with claim 1, wherein the release mechanism for releasing the toggle lever from the stretched-out blocking position has an electromagnet and a permanent magnet is located directly opposite the electromagnet in the stretched-out blocking position, arranged in the center of the toggle lever, the electromagnet generating a magnetic field repelling the permanent magnet for the release.

8. A shifting device in accordance with claim 1, further comprising a securing element arranged at the toggle lever, the securing element holding the toggle lever reversibly in the stretched-out blocking position.

9. A shifting device in accordance with claim 8, wherein the securing element is a spring element acting on the legs of the toggle lever.

10. A shifting device in accordance with claim 8 above, wherein the securing element is a permanent magnet acting on the axis between the legs of the toggle lever.

11. A shifting device in accordance with claim 1, wherein two toggle levers are provided on both sides of the selector lever.

12. A shifting device in accordance with claim 11 above, wherein said two toggle levers are provided with an opposite toggle lever leg pair with said toggle lever leg pairs connected to one another.

13. A transmission shifter device comprising:

a shift lever pivotable about a lever pivot, with movement of said lever between numerous discrete positions bringing about selection of a mode of a vehicle transmission including that of a parking, a neutral, a reverse and a drive mode, with each of said modes attained with a movement of said shift lever to a said discrete position corresponding to a said mode;

a blocking mechanism for blocking the movement of said shift lever, said blocking mechanism comprising a blocking contour and a moveable engagement element with a spring acting to move said engagement element into engagement with said blocking contour, wherein engagement of said engagement element with said blocking contour prevents movement of said shifter lever from a said discrete position entirely or from a said discrete position to one or more other said discrete positions;

a release actuator moving said blocking element against said spring away from said blocking contour to allow a movement of said shift lever between said discrete positions;

a two link toggle mechanism connected between said engagement element and a fixed portion of the shifter device, said two links having a straightening spring acting to straighten said two links of said toggle mechanism into an un-broken position, wherein in said un-broken position said toggle mechanism links prevent a movement of said engaging element away from engagement with said blocking contour;

a release mechanism, said release mechanism breaking said toggle elements from said straight un-broken position allowing a movement of said engagement element away from engagement with said blocking contour upon actuation of said release actuator.

14. A motor vehicle automatic transmission shifting device that can be in at least one secured and one unsecured state, the device comprising:

a pivotable selector lever for selecting different gears and/or gear selections;

a first blocking mechanism to block the pivoting movement of the selector lever, the first blocking mechanism having displaceable blocking element and at least one stationary blocking contour for engaging the blocking element, the selector lever being prevented from pivoting by the blocking element engaging the blocking contour;

a second blocking mechanism with at least one toggle lever in contact with a stop for preventing the releasing the first blocking mechanism in a stretched-out blocking position and unlocking the first blocking mechanism in the bent release position and a release mechanism for releasing the toggle lever from the stretched-out blocking position, the toggle lever being arranged acting on the blocking element of the first blocking mechanism, wherein two toggle levers are provided on both sides of the selector lever.

* * * * *